United States Patent [19]

Wertheizer et al.

[11] Patent Number: 5,463,749

[45] Date of Patent: Oct. 31, 1995

[54] SIMPLIFIED CYCLICAL BUFFER

[75] Inventors: Gideon Wertheizer; Be'ery Yair, both of Petach-Tikva; Bat-Sheva Ovadia, Herzeliya; Yael Gross, Tel-Aviv; Ronen Perets, Ramat-Gan; Yakov Milstein, Natanya, all of Israel

[73] Assignees: DSP Semiconductors Ltd, Israel; DSP Semiconductors USA, Inc., San Jose, Calif.

[21] Appl. No.: 3,640

[22] Filed: Jan. 13, 1993

[51] Int. Cl.$^6$ ................................. G06F 12/00

[52] U.S. Cl. .................. 395/437; 364/DIG. 1; 364/DIG. 2; 364/238.6; 364/238.8; 364/926.1; 364/926.4; 395/421.08

[58] Field of Search ........................ 395/400, 200, 395/250, 425; 364/DIG. 1 MS File, DIG. 2 MS File

[56] References Cited

U.S. PATENT DOCUMENTS

| | | | |
|---|---|---|---|
| 4,202,035 | 5/1980 | Lane | 395/400 |
| 4,800,524 | 1/1989 | Roesgen | 395/400 |
| 4,809,156 | 2/1989 | Taber | 395/400 |
| 4,833,602 | 5/1989 | Levy et al. | 395/400 |
| 4,935,867 | 6/1990 | Wang et al. | 395/400 |
| 5,134,695 | 7/1992 | Ikeda | 395/400 |
| 5,247,645 | 9/1993 | Mirza et al. | 395/425 |
| 5,276,827 | 1/1994 | Delaruelle et al. | 395/400 |
| 5,282,275 | 1/1994 | Andre et al. | 395/400 |

*Primary Examiner*—Robert B. Harrell
*Attorney, Agent, or Firm*—Leonard Bloom

[57] ABSTRACT

An improved cyclical buffer having an integer M number of memory locations in respect of which a number STEP of consecutive memory locations are required to be accessed in a single operation and having a predetermined START location defining an initial memory location to be accessed. M is constrained to be an integer multiple of STEP and the k least significant bits of START are zero where k is the minimal integer satisfying the relation $2^k > M - |STEP|$. The result is the same as the general MODULO algorithm employed in conventional cyclical buffers but without the cost of implementing the complete MODULO function. An apparatus for generating successive addresses involves an ADDER and a k-bit COMPARATOR coupled via a MULTIPLEXER to an address register such that the k-least significant bits of the ADDER or M−|STEP| or 0 is fed to the k-least significant bits of the address register depending on the output of the k-bit COMPARATOR.

4 Claims, 3 Drawing Sheets

SIMPLIFIED CYCLICAL BUFFER

FIELD OF THE INVENTION

This invention relates to a cyclical buffer for use in low cost applications.

BACKGROUND OF THE INVENTION

A cyclical buffer is a mechanism which provides access to a group of data elements stored in consecutive memory locations in a memory device.

Cyclical buffers are frequently used in Digital Signal Processing applications, where the data to be processed are stored in consecutive memory locations of a memory device. While processing the data, a processor scans the memory locations in the memory device in order to access the data at the desired memory locations.

FIG. 1 shows schematically such a cyclical buffer which is assumed to contain M consecutive memory locations starting at a memory location START and terminating at a memory location END such that END=START+M−1.

The cyclical buffer mechanism allows for the same operation to be performed on the elements in a repeated, cyclical manner. The elements are processed, one at a time, starting with the element in memory location START, proceeding until the element in memory location END is reached and then returning to the element in memory location START and then repeating the cycle as required.

The processing mechanism may be stepped whereby the cyclical buffer addressing mechanism is incremented or decremented by an amount equal to STEP after each access so that the elements are processed starting with the element location START, proceeding to START+STEP, and so on as far as END and then repeating the cycle in "STEP" increments as required.

It can easily be shown that the cyclical buffer mechanism is represented by the following algorithm:

ELEMENT_ADDRESS:=START

REPEAT FOR ERROR:

ELEMENT_ADDRESS:=(ELEMENT_ADDRESS+STEP) MODULU (M) and repeat;

wherein: (A) MODULU (n) is defined as: A−[A/B]*B where [A/B] is the integer part of A/B.

Such a mechanism permits successive addresses within the cyclical buffer to be addressed starting at any location and allowing for any value of STEP so that all addressable locations in the cyclical buffer are utilized and ensuring that when the end of the cyclical buffer is reached, the mechanism automatically cycles to the correct address location.

In practice, however, it is found that a high processing price is paid for implementing MODULU function which renders a complete hardware implementation both complex and expensive. Generally, hardware mechanisms allowing for zero penalty scanning of the data elements are used in high performance applications. Usually, an initialization command activates the cyclic buffer process and determines the values of START, M and STEP. Following the execution of the initialization command, the processor starts performing the "operation" on the buffer elements. The hardware mechanism manipulates the data elements. The address manipulation is performed in parallel to the operation execution so that there is no performance penalty in terms of the execution time thereof. However, as stated above, a high penalty is paid in terms of complexity and cost.

It is therefore known in very low cost applications to implement the cyclical buffer using software only. In this case, there is no dedicated hardware for cyclical buffering. A software program accesses the appropriate memory locations, performs the operation on the data elements, calculates the memory address of the next data element, accesses the next element and performs the operation thereon. This cycle is repeated indefinitely.

Such an approach requires additional memory in order to store the software code therein and greatly increases the processing time involved in address calculation and iteration control.

Finally, in mid-range applications a dedicated mechanism allows for zero penalty scanning and provides almost the same fast processing as a dedicated hardware mechanism whilst being constrained to very specific buffer parameters. For example, in one particular implementation, M is an integer power of 2 and START is an integer multiple of M. Such an approach is used in the ZR34325 32-Bit Floating Point Vector Signal Processor manufactured by Zoran and described on pages 37 and 38 of the Manufacturer's Data Specification. Such an approach limits the length of the buffer to $2^n$.

Whilst such an approach considerably simplifies the hardware complexity, the restrictions increase the execution time and the required memory space.

SUMMARY OF THE INVENTION

It is an object of the invention to provide a simplified cyclical buffer which provides a performance identical to that of the high end hardware implementation but at greatly reduced cost.

According to the invention there is provided in a cyclical buffer having an integer M number of memory locations, an integer STEP defining a number of consecutive memory locations whose contents are required to be accessed in a single operation and a predetermined START location defining a lower boundary of the cyclical buffer; the improvement wherein:

M is an integer multiple of STEP, and k is the minimal integer satisfying the relation $2^k > M − |STEP|$; and the k least significant bits of START are zero.

It may be shown that the restrictions on the values of the buffer parameters do not affect the execution time and have a minor effect on the required memory space.

BRIEF DESCRIPTION OF THE DRAWINGS

In order to understand the invention and to see how the same may be carried out in practice, a preferred embodiment will now be described, by way of non-limiting example only, with reference to the accompanying drawings in which.

DETAILED DESCRIPTION OF A PREFERRED EMBODIMENT

Figure 2:
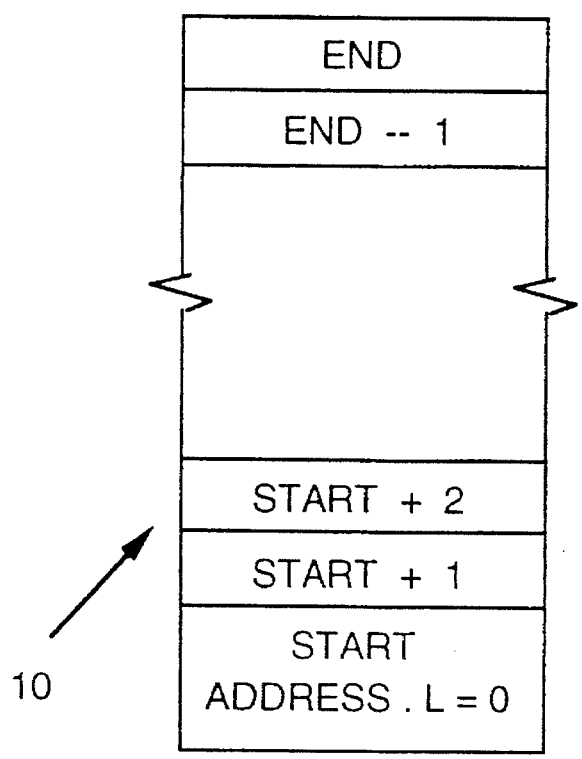
FIG. 2 shows schematically a cyclical buffer according to the invention.

Referring to FIG. 2, there is shown a cyclical buffer designated generally by 10 having M addressable locations starting at an address START and terminating at an address END, such that END=START+M−1.

Each of the memory locations in the cyclical buffer 10 has at least k bits, it being a condition that:

$$START.L=0 \quad (1)$$

where START.L are the k least significant bits of memory address START and k is the minimal integer which satisfies the relation:

$$|2^k>M-|STEP| \quad (2)$$

The reason for the inequality defined by equations (1) and (2) will become clearer from the following description.

Figure 1:
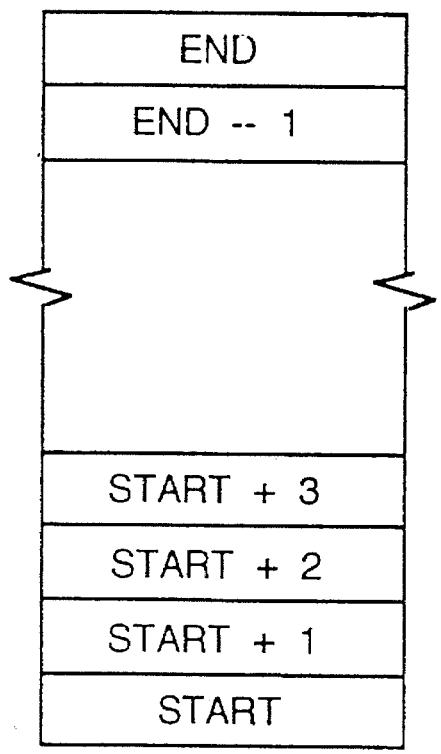
FIG. 1 shows schematically a typical prior art cyclical buffer useful in explaining the terminology associated with the invention.

Whereas, in the most flexible implementations of the prior art cyclical buffer shown in FIG. 1 place no constraint on the values of START, M and STEP, the cyclical buffer 10 shown in FIG. 2 is subject to the additional constraint that M is an integer multiple of STEP.

Figure 3:
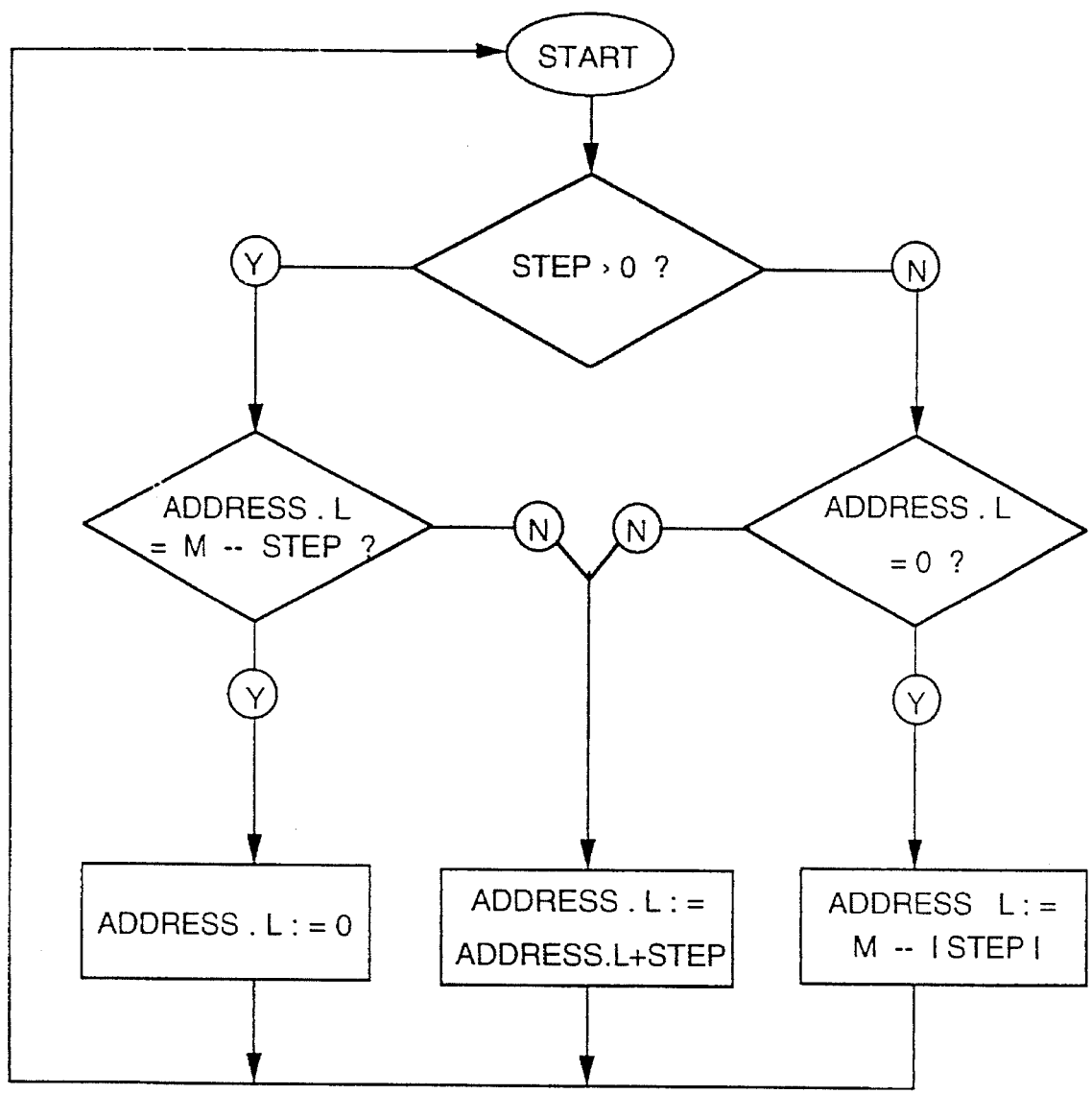
FIG. 3 is a flow diagram showing the principal operating steps associated with the cyclical buffer of FIG. 2 for generating successive address locations.

FIG. 3 is a flow diagram showing the principal steps associated with the addressing mechanism employed by the cyclical buffer 10 shown in FIG. 2. The cyclical buffer 10 may be addressed in either a positive or negative direction according to whether STEP greater than or less than zero, respectively.

If the value of STEP is greater than zero, then a check is performed in order to determine whether the value of the k least significant bits of the current address denoted by ADDRESS.L is equal to M−|STEP|.

If so, then the k least significant bits of the address are set to zero, thereby causing the cyclical buffer to point to the address associated with the START location. In this connection, it will be recalled that the cyclical buffer 10 has M addressable locations. Thus, the current address location may be incremented by the value of STEP up to and including M−|STEP|, whereupon incrementing the address further by the value of |STEP| would point to an address beyond the end of the cyclical buffer 10. The k least significant bits of the address are therefore set to zero corresponding to the START location.

If, on the other hand, the value of the k least significant bits of the current address is less than the value of M−STEP, then the current address is simply incremented by the value of STEP in order to point to the next memory location in the cyclical buffer 10.

If the value of STEP is less than zero, then a check is performed in order to determine whether the current value of the k least significant bits of the address are equal to zero. In this case, it will be recalled that the cyclical buffer is cycling down (rather than up), the length M of the cyclical buffer 10 being constrained to be an integer multiple of STEP in order that the k least significant bits of the final address in each cycle is zero. Whenever this occurs, the next address location is set to M−|STEP|.

If the value of the k least significant bits of the current address is not equal to zero, this means that we have not yet reached the end of the cycle mechanism (i.e. the start location of the cyclical buffer), and in this case the next address is simply determined by incrementing the current address by the value of STEP which, being negative, actually decrements the k least significant bits of the address.

It will be appreciated from the foregoing description that the cyclical buffer mechanism generates the k least significant bits of the address, the values of any remaining bits being irrelevant so far as the invention is concerned. However, in order that there be sufficient addressable locations within the cyclical buffer 10, the k least significant bits of each addressable location must be capable of having as many permutations as there are required addressable locations. It is for this reason that the inequality:

$$2^k>M-|STEP| \quad (2)$$

defined above (2) applies. This can be further demonstrated by way of example.

EXAMPLE 1

M=7 and STEP=1.

This requires that $2^k>6$ i.e. k=3.

If the START location be denoted by 1000 (binary) then the seven addressable locations are as follows:

1000
1001
1010
1011
1100
1101
1110

It will be noted that the three least significant bits associated with the highest addressable location are 110 which is equal to 6 i.e. the value of M−|STEP|.

In such a cyclical buffer, STEP is greater than zero and by examining the logic shown in FIG. 3, it will be seen that the k least significant bits of the addressable locations range from 000 to 110.

EXAMPLE 2

If START is set to 10000, then the seven addressable locations associated with the cyclical buffer 10 are as follows:

10000
10001
10010
10011
10100
10101
10110

Since, as before, each addressable location is determined by calculating only the k least significant bits thereof, the two most significant bits are unimportant so far as the calculation of successive addressable locations is concerned except insofar as they are, of course, calculated relative to the predefined START location which must be successively incremented by STEP until the end of the cyclical buffer is reached.

Thus, in the above example, by applying the logic described above with reference to FIG. 3, it can be shown that the cyclical buffer generates addresses from 10000 to 10110 whereupon it will again start to cycle at 10000.

EXAMPLE 3:

If, however, START is set to 100 such that only the two least significant bits are zeroed, thereby not complying with the inequality $2^k>M-|STEP|$ then only the following locations in the cyclical buffer are addressable:

100
101
110 thereby rendering it impossible to address all seven required addressable locations.

EXAMPLE 4

M=8 and STEP=2

$2^k > 8-2$ thereby requiring that k=3.

In such case the eight addressable locations are as follows:

1000
1001
1010
1011
1100
1101
1110
1111 where only the highlighted addresses are accessed in view of the fact that STEP is equal to 2.

EXAMPLE 5

M=9 STEP=−3

This requires that $2^k > 9-3$ again requiring that k=3. Likewise, START must be greater than or equal to 1000 (binary). The cyclical buffer which conforms to these requirements is as follows:

1000
0111
0110
0101
0011
0010
0001
0000 where only the highlighted addresses are accessed in view of the fact that the absolute magnitude of STEP is equal to 3.

Figure 4:
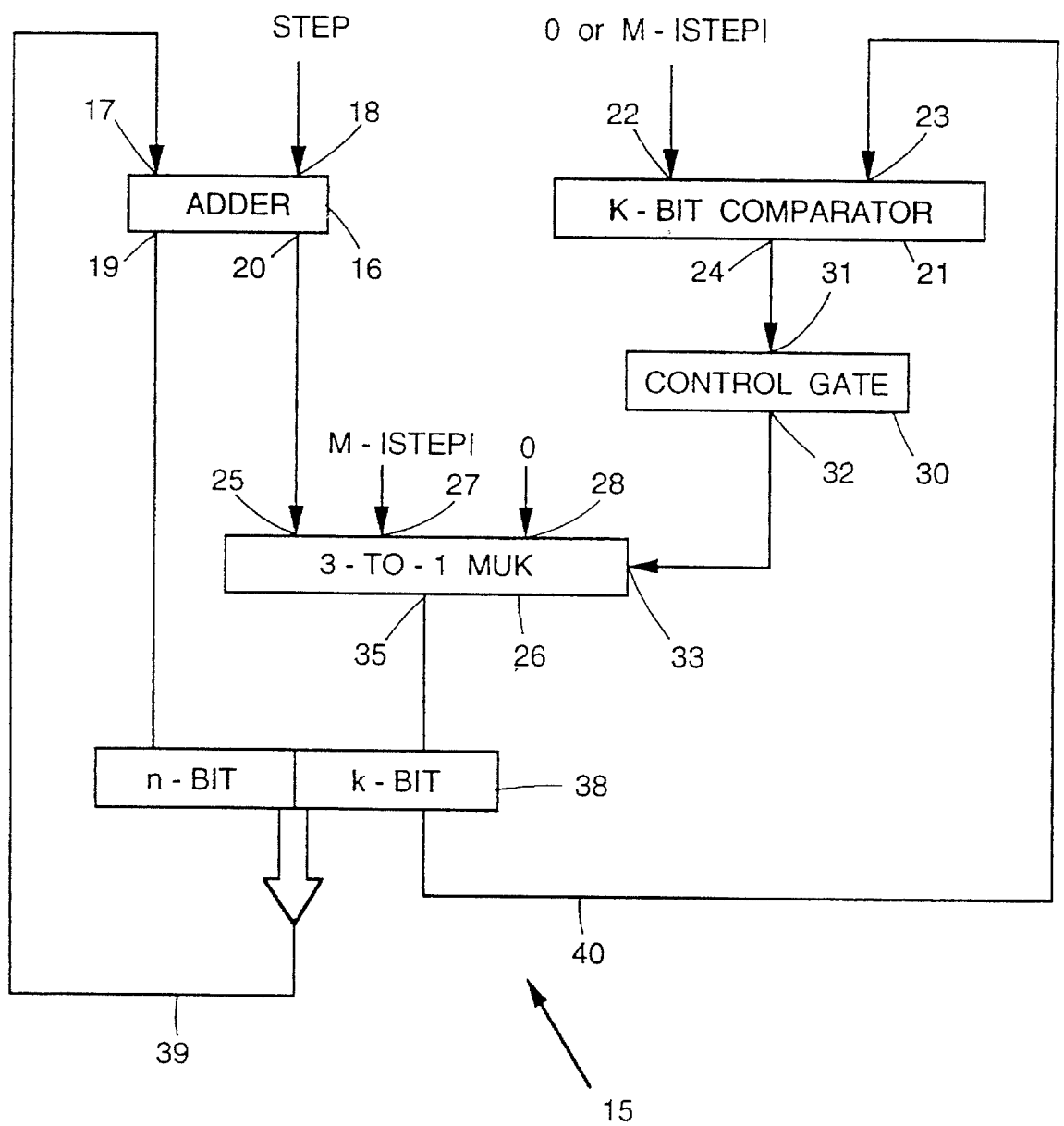
FIG. 4 is a block diagram of an apparatus for use in conjunction with the cyclical buffer of FIG. 2 for generating successive address locations thereof.

Referring now to FIG. 4, there is shown a block diagram of an apparatus designated generally as 15 which may be used in conjunction with the cyclical buffer 10 shown in FIG. 2 for generating successive addressable memory locations therein.

The apparatus 15 comprises an ADDER 16 having first and second input terminals 17 and 18, respectively, and two outputs 19 and 20. A k-bit COMPARATOR 21 is also provided having first and second input terminals 22 and 23, respectively, and an output terminal 24.

A first input terminal 25 of a 3-TO-1 MULTIPLEXER 26 is coupled to the output 20 of the ADDER 16 and is further provided with second and third input terminals 27 and 28, respectively, which are set to M−|STEP| and to 0, respectively.

A CONTROL GATE 30 has an input terminal 31 connected to the output terminal 24 of the COMPARATOR 21 and an output terminal 32 coupled to a control terminal 33 of the MULTIPLEXER 26.

The CONTROL GATE 30 is responsive to the output of the COMPARATOR 21 appearing at its output terminal 24 for connecting the first terminal 25, the second terminal 27 or the third terminal 28 of the MULTIPLEXER 26 to an output terminal 35 thereof according to whether:

(i) STEP>0 AND ADDRESS.L ≠ M−|STEP| OR STEP<0 AND ADDRESS.L ≠ 0

(ii) STEP<0 AND ADDRESS.L=0, and (iii) STEP>0 AND ADDRESS.L=M−|STEP|, respectively.

The output terminal 35 of the MULTIPLEXER 26 is connected to the k least significant bits of a REGISTER 38 having a total of (n+k) bits. It will be appreciated from the foregoing examples that, owing to the fact that M is constrained to be an integer multiple of STEP, only the k least significant bits of the address vary, the n most significant bits remaining constant.

It would therefore be possible to employ only a k-bit ADDER and to supply the unchanging n most significant bits to the REGISTER 38 separately. The drawback with such an arrangement, however, is that for each different value of k, a different ADDER would be required thereby rendering the resulting design too specific if only a single ADDER were to be used and rendering it too complex and costly if multiple ADDERs were employed each selectable according to the application.

The arrangement shown in FIG. 4 overcomes this drawback by employing an (n+k)-bit ADDER whose total size remains constant regardless of the value of k. The n most significant bits of the address are provided by ADDER 16 whose n most significant bits are connected to the n most significant bits of the REGISTER 38 via the output 19 of the ADDER 16. Consequently, even if k changes as shown in the foregoing examples, the n most significant bits of the address may be still be derived from the n most significant bits of the ADDER 16. Furthermore, all (n+k) bits may be latched within the REGISTER 38 simultaneously: there being no requirement to provide a separate latching mechanism in respect of the n most significant bits and the k least significant bits as would be the case if only a k-bit ADDER were employed. Thus employing a (n+k)-bit ADDER for handling both the n most significant bits as well as the k least significant bits results in a simplified and more cost effective arrangement.

An output 39 of the REGISTER 38 is connected to the input 17 of the ADDER 16 whereby all (n+k) bits of the REGISTER 38 are fed to the ADDER 16. An output 40 of the REGISTER 38 corresponding to the k least significant bits thereof is connected to the second input 23 of the COMPARATOR 21. The second terminal 18 of the ADDER is set to the value of STEP. The CONTROL GATE 30 applies successive trigger pulses to the control terminal 33 of the MULTIPLEXER 26 in order to generate successive addresses of the cyclical buffer 10 at the output 39 of the REGISTER 38.

It will thus be seen that stepping through the cyclical buffer involves changing the k-least significant bits of the memory address between zero and M−|STEP|, whilst the remaining address bits are not changed.

It will be appreciated that many different mechanisms may be employed to achieve such an objective without departing from the spirit of the invention.

We claim:

1. A cyclical buffer having an integer M number of memory locations, an integer STEP defining a number of consecutive memory locations, M being an integer multiple of STEP, and a predetermined START location defining an initial memory location defining a lower boundary of the cyclical buffer; and further including an addressing means for attaining improved buffer accessibility by setting, as many times as required, a current address to an address of successive memory locations whose contents are accessible, comprising:

least bit addressing means for addressing at least k least significant bits of the buffer where:
k is the minimal integer satisfying the relation $2^k > M-|STEP|$; and
the k least significant bits of START are zero; and the least bit addressing means includes:
incrementing means for incrementing the current address by STEP if STEP is positive and the k least significant bits of the current address are not equal to M–|STEP|,
said incrementing means further for incrementing the current address by STEP if STEP is negative and the k least significant bits of the current address are not equal to 0,
zero setting means for setting the address to zero if STEP is positive and the current address is equal to M–|STEP|, and
decrementing means for setting the address to M–|STEP| if STEP is negative and the k least significant bits of the current address are equal to 0.

2. For use with the cyclical buffer according to claim 1, an apparatus for generating the k least significant bits of an (n+k)-bit address of successive memory locations, each successive location being displaced from a preceding location by a value STEP, said apparatus comprising:

an ADDER having first and second inputs and at least a k-bit output,
a k-bit COMPARATOR having first and second inputs and an output control,
a 3-TO-1 MULTIPLEXER having a first k-bit input connected to the output of the ADDER and further having second and third inputs, a control input and an output,
a CONTROL GATE having an input thereof connected to the output of the COMPARATOR and having an output thereof connected to the control input of the MULTIPLEXER, and
a (n+k)-bit REGISTER having a k-bit input and an n-bit input and having a k-bit output and an n-bit output, said k-bit input and output constituting least significant bits of a value stored in the REGISTER and said n-bit input and output constituting most significant bits of said value, the k-bit input connected to the output of the MULTIPLEXER and the k-bit output being connected to the second input of the COMPARATOR and to the first input of the ADDER; wherein:
the second input of the ADDER is set to the value of STEP,
the second and third inputs of the MULTIPLEXER are set to M–|STEP| and 0, respectively,
the first input of the k-bit COMPARATOR is set to 0 if STEP <0 and to M–|STEP| if STEP >0, and
the CONTROL GATE is responsive to the output of the k-bit COMPARATOR for connecting the first, second or third input of the MULTIPLEXER to the output thereof according to whether:
(i) STEP>0 AND ADDRESS.L≠M–|STEP|OR STEP<0 AND ADDRESS.L≠0
(ii) STEP<0 AND ADDRESS.L=0, and
(iii) STEP>0 AND ADDRESS.L=M–|STEP|, respectively;
where ADDRESS.L denotes the k least significant bits of the current address.

3. The apparatus according to claim 2, wherein:
the ADDER is a (n+k)-bit ADDER having first and second outputs each feeding n and k bits, respectively,
the first k-bit input of the 3-TO-1 MULTIPLEXER is connected to the second output of the ADDER,
the first output of the ADDER is connected to the n-bit input of the REGISTER, and
the n-bit output of the REGISTER together with the k-bit output thereof are connected to the first input of the ADDER.

4. In a cyclical buffer having an integer M number of memory locations each having at least k addressable locations, an integer STEP defining a number of consecutive memory locations, M being an integer multiple of STEP, and a predetermined START location defining an initial memory location defining a lower boundary of the cyclical buffer wherein:

k is the minimal integer satisfying the relation $2^k > M-|STEP|$; and
the k least significant bits of START are zero; a method for attaining improved buffer accessibility by setting as many times as required the current address to an address of successive memory locations, comprising the steps of:
if STEP is positive and the k least significant bits of the current address are not equal to M–|STEP|, incrementing the current address by STEP;
if STEP is positive and the current address is equal to M–|STEP| setting the address to 0;
if STEP is negative and the k least significant bits of the current address are not equal to 0, incrementing the current address by STEP; and
if STEP is negative and the k least significant bits of the current address are equal to 0, setting the address to M–|STEP|.

* * * * *

UNITED STATES PATENT AND TRADEMARK OFFICE
CERTIFICATE OF CORRECTION

PATENT NO. : 5,463,749
DATED : October 31, 1995
INVENTOR(S) : WERTHEIZER et. al.

It is certified that error appears in the above-indentified patent and that said Letters Patent is hereby corrected as shown below:

On the title page, item [75]; change the name of the second inventor from "Be'ery Yair" to --Yair Be'ery--.

In column 3, line 19, change "$12^{\lfloor >M-|STEP|\rfloor}$" to -- $2^{\lfloor >M-|STEP|\rfloor}$ --.

In column 3, line 38, change "arc" to -- are --.

In column 3, line 45, change "|STEP|" to -- STEP --.

In column 3, line 50, change "STEP" to -- |STEP| --.

In column 4, line 19, change "6i.e." to -- 6 i.e. --.

In column 5, between lines 14 and 23, the following should be bold type

--1000, 1010, 1100, 1110 --.

In column 5, between lines 34 and 43, the following should be bold type

-- 0110, 0011, 0000 --.

In column 8, line 9, change "ADBRESS" to --ADDRESS--.

UNITED STATES PATENT AND TRADEMARK OFFICE
CERTIFICATE OF CORRECTION

PATENT NO. : 5,463,749
DATED : October 31, 1995
INVENTOR(S) : WERTHEIZER et al.

It is certified that error appears in the above-indentified patent and that said Letters Patent is hereby corrected as shown below:

In column 8, line 9, delete "OR".

In column 8, line 10, before "STEP", insert -- OR --.

Signed and Sealed this

Second Day of April, 1996

Attest:

BRUCE LEHMAN

*Attesting Officer*  *Commissioner of Patents and Trademarks*